United States Patent [19]

Krämer et al.

[11] 4,395,357
[45] Jul. 26, 1983

[54] CALCIUM SILICATE GRANULES FORMING A MICROPOROUS STRUCTURE

[75] Inventors: Walter Krämer, Soltau-Friedrichseck; Rainer Follmann, Minden, both of Fed. Rep. of Germany

[73] Assignee: Mars Inc., McLean, Va.

[21] Appl. No.: 273,224

[22] Filed: Jun. 12, 1981

Related U.S. Application Data

[63] Continuation of Ser. No. 114,140, Jan. 21, 1980, abandoned.

[30] Foreign Application Priority Data

Jan. 19, 1979 [DE] Fed. Rep. of Germany ....... 2902108

[51] Int. Cl.³ .................. B01J 20/22; B01J 20/10; A01K 1/015; C01B 33/24
[52] U.S. Cl. ..................... 252/428; 55/74; 119/1; 210/680; 210/691; 210/925; 252/430; 252/457; 423/331; 424/357
[58] Field of Search ............ 252/428, 430, 451, 457; 423/331; 119/1; 55/74; 210/660, 680, 691, 925

[56] References Cited

U.S. PATENT DOCUMENTS

| 2,966,441 | 12/1960 | Vander-Linden et al. | 252/457 |
| 4,034,139 | 7/1977 | Mazarguil et al. | 252/430 |
| 4,164,482 | 8/1979 | Berger et al. | 252/430 |
| 4,275,684 | 6/1981 | Kramer et al. | 119/1 |

FOREIGN PATENT DOCUMENTS

| 48-23799 | 7/1973 | Japan | 423/331 |
| 52-42499 | 4/1977 | Japan | 252/457 |
| 2111011 | 11/1972 | Fed. Rep. of Germany | 55/74 |
| 2902079 | 11/1979 | Fed. Rep. of Germany | 119/1 |
| 2832194 | 1/1980 | Fed. Rep. of Germany | 252/457 |

Primary Examiner—P. E. Konopka
Attorney, Agent, or Firm—Merriam, Marshall & Bicknell

[57] ABSTRACT

The invention deals with calcium silicate granulates or powders with a microporous structure, which are obtained, by reacting crystalline or, if required, amorphous silicon dioxide, or materials containing the same, with calcium oxide or materials containing the same, in a CaO to SiO₂ molar ratio of 0.8:1 to 1:1:1, by homogenizing the same in water together with a suitable additive and molding, autoclave setting, comminuting, drying, and grading with the further proviso that the homogenization during the reaction is carried through by dispersion of the starting materials in water by adding an anion-active surfactant, which had previously been converted in water into a microporous stable foam, obtained as absorbents and adsorbents for liquids, vapors and gases, as well as calcium silicate granulates of this type with further developing additives, which in the use for absorption of hydrophilic liquids are fatty amines, whereas in the use of the absorbent for oleophilic liquids and gases polyamide waxes, fatty amine salts or saponification resistant alkoxy silanes may be used.

9 Claims, 3 Drawing Figures

CALCIUM SILICATE GRANULES FORMING A MICROPOROUS STRUCTURE

This is a continuation, of application Ser. No. 114,140, filed Jan. 21, 1980, now abandoned.

This invention relates to the use of calcium silicate granulates and powders as specified hereinafter, for absorption and adsorption.

Known products intended for use for liquid absorption and adsorption are basically natural products of mineral or organic origin, such as pumice stone, clay minerals, e.g. sepiolites, sawdust and kieselguhr, which have hydrophilic and/or lipophilic properties because of their natural porosity. Organic products, however, have the disadvantage of undesirable side effects, e.g. combustibility, when they are used, while mineral products, such as clay minerals, tend to swell as a rule, due to the absorption of the liquids, mainly after the absorption capacity has been reached, and the result of this is a plastic consistency (softening) and caking. This is even more pronounced in the case of kieselguhr, which becomes very tacky, greasy and even pasty. These disadvantages necessarily result in difficulties when such products are handled. Pumice stone has the disadvantage of inadequate absorption. It is therefore used in mixture with sepiolites, and this again entails the aforementioned disadvantages of the latter.

Since these known absorbents and adsorbents are mainly natural products, they also have the disadvantage of relatively considerable variations as a rule in respect of their chemical and mineral composition, and they differ in respect of the nature and quantity of their impurities. The attempt has been made to compensate for these known disadvantages, e.g. by adding sand, but this again results in a reduction of the concentration of the active constituents, leading to reduced absorption of the products, without effectively eliminating the above adverse properties.

The object of this invention is to obviate the disadvantages of the prior art and enable novel products of low bulk weight to be used as absorbents and adsorbents for liquids, vapors and gases, said products having better absorption, i.e. accelerated absorption with better absorption capacity (storage volume) and uniform particle structure, and said products do not swell or become tacky or greasy, do not smell when in contact with uric acid and in fact on the contrary eliminate smells, are bactericidal, do not evolve dust and are non-staining.

The above problem has surprisingly been solved by the invention.

The subject matter of German patent application No. P 28 32 194.0, which is not a prior publication, is a process for producing calcium silicate granulates or powders with a microporous structure by reacting crystalline and, if required, amorphous silicon dioxide or materials containing the same, with calcium oxide or materials containing the same, in a CaO to $SiO_2$ molar ratio of 0.8:1 to 1.1:1, with homogenization thereof in water and moulding, autoclave setting, comminuting, drying and grading, homogenization being carried out during the reaction by dispersing the solid starting materials in water with the addition of an anion-active surfactant which has previously been converted to a microporous stable foam in water.

It has now surprisingly been found that the resulting products can be used as absorbents and adsorbents for liquids, vapors and gases, with superior results.

The subject matter of the invention is therefore the use of calcium silicate granulates or powders or more accurately calcium silicate hydrate granulates or powders having a microporous structure as absorbents or adsorbents for liquids, vapors and gases, said calcium silicate granulates or powders being prepared by reacting crystalline and, if required, amorphous silicon dioxide, or materials containing the same, with calcium oxide or materials containing the same, in a CaO to $SiO_2$ molar ratio of 0.8:1 to 1.1:1, with homogenization thereof in water and moulding, autoclave setting, comminuting, drying and grading with the further provisio that homogenization during the reaction has been carried out by dispersing the solid starting materials in water with the addition of an anion-active surfactant previously converted in water to a microporous stable foam.

The anion-active surfactant can advantageously be a solution with an active substance content (before being dissolved in water) of 30 to 60%, e.g. 50%. Alternatively, pulverulent products obtained by drying by dehydration may be used with an active substance content of up to 100%. Advantageously, the concentration of the anion-active surfactant in water for the microporous stable foam to be added for homogenization, is about 1.0 to 2.5%, more particularly 1.5%, when the anion-active surfactant used has an active substance content of 100%, and about 1.5 to 3.5%, more particularly 2%, when the anion-active surfactant used has an active substance content of from 30 to 60%. If the anion-active surfactant used does not have an active substance content of 100%, these concentrations refer to the product as actually used, i.e. the chemical product which may or may not be impure. For example, a 2% concentration of the anion-active surfactant in water in the case of an active substance content of 50% is equivalent to a concentration of 1% pure surfactant in water. Sodium lauryl sulphate is one example of an anion-active surfactant that can be used. It is also advantageous to produce the microporous stable foam by means of compressed air. A solution of the anion-active surfactant prepared by dilution with water is advantageously converted, in a very fine distribution, to a microporous stable foam in the compressed air, which, for example, is produced in an active foam generator. This foam has the consistency of a whipped cream and has left the active foam generator via a hose connection or pipeline and can be fed to the dispersion operation. The microporous stable foam preferably has a weight of 30 to 30 g per liter, more particularly 50 to 60 g per liter. The amount of anion-active surfactant depends on the attainable foam volume during the foam production, as in the active foam generator, and in the initial mixture it was determined by the required crude density (bulk density) of the granulate or powder being produced. It was therefore a function of the $$\text{inflation factor}\left(=\frac{\text{Volume of finished product}}{\text{Volume of amount of solids used}}\right),$$

and should also be selected for stability of the foam and in order to ensure tht the foam is worked into the initial mixture in such a way as not to impair the foam. The anion-active surfactant (calculated on an undiluted basis) is preferably used in a quantity of from about 300 to 600 g/m³ finished product.

The microporous product structure of the calcium silicate granulates or powders used according to the invention is very important since it ensures the required product properties, such as the high absorption capacity and high compressive strength and low crude density (bulk density).

Advantageously, the silicon dioxide and calcium oxide or materials containing the same are used in the form of raw materials containing the minimum amount of impurities. Preferably, the crystalline silicon dioxide used will be quartz powder, i.e. a powder prepared by finely grinding quartz sand and having a fineness of less than 100$\mu$. It is possible jointly to use amorphous silicon dioxide or materials containing the same. However, it is more advantageous to use just crystalline silicon dioxide or materials containing the same. Preferably, the calcium oxide or material containing the same is used in the form of quicklime and/or hydrate of lime. It is preferred to use calcium oxide or materials containing the same in the form of mixtures of quicklime and hydrate of lime. It is particularly preferred to use calcium oxide or material containing the same in the form of a proportion of about two-thirds quicklime and a proportion of about one-third hydrate of lime. The slaking heat of the quicklime is thus anticipated to a specific amount. Alternatively, quicklime or hydrate of lime may be used on their own. The quicklime is advantageously used in the form of fine white lime. The composition of the initial solids mixture is advantageously as follows: About 50 to 57% by weight of quartz powder, about 28 to 33% by weight of quicklime and about 14 to 17% by weight of hydrate of lime. As already stated, the quicklime may be completely or partially replaced by hydrate of lime and the hydrate of lime may be completely or partially replaced by quicklime. Advantageously, the water (total of the mix water and of the water required for foam forming) is used in a quantity of from 45 to 70% by weight, more particularly 48 to 60% by weight, based on the amount of solids mixture used, and calculated as dry weight. Advantageously, 8 to 12% of this water is used for foaming and 88 to 92% as water for mixing.

Advantageously, after the starting materials have been mixed and prepared for moulding and before setting in the autoclave, a preliminary reaction is carried out lasting for at least 30 minutes. In other words this is the time required after the initial mixture has been prepared and poured into the mould and until setting is carried out in the autoclave. During this preliminary reaction time adequate stiffening to withstand autoclave setting is carried out by means of high-pressure steam. There is no disadvantage if this minimum preliminary reaction time is extended. The preliminary reaction is advantageously carried out at a temperature of from 70° to 80° C. When quicklime is used, e.g. fine white lime, this temperature occurred automatically with the use of relatively small quantities of water, due to the reaction heat of the quicklime, there being no need to provide any other kind of heat supply. In the case of hydrate of lime used on its own, however, preheating of the water used (mixing water) to 70°–80° C. was necessary in order to reach the said temperature.

Generally, the pore radii of the calcium silicate granulates or powders used according to the invention are less than 100$\mu$, preferably less than 60$\mu$, more particularly 10 to 20$\mu$.

The calcium silicate granulates or powders used according to the invention have a high inherent particle strength and hence high compressive strength and low bulk density.

The calcium silicate granulates or powders used may have the following material strength and material density parameters (here and hereinafter the international dimension $N/mm^2$ denotes Newton/square $mm = 10$ $kp/cm^2$):

| | |
|---|---|
| Compressive strength in $N/mm^2$ | 6.5 to 10.2 |
| Crude density in $kg/m^3$ | 400 to 700 |
| Bulk density in $kg/m^3$ | 250 to 500 |
| (Bulk density of particle sizes up to 2.5 mm in $kg/m^3$ | 300 to 500) |
| Bulk density of particle sizes from 2.5 to 4 mm | 250 to 450). |

The calcium silicate granulates and powders according to the invention are also distinguished by superior and always uniformly reproducible absorption and adsorption power. Their absorption capacity in respect of water (saturation water absorption) may be 200% by weight (in the case of a bulk density of 450 g/l) and more and their absorption capacity with respect to oil 130% by weight (for a bulk density of 450 g per liter). In addition they have an accelerated absorbency, i.e. what is known as the "blotting paper effect."

A great advantage of the use according to the invention is that although the calcium silicate granulates or powders used according to the invention have high absorption power they do not swell, are not tacky and are not greasy, unlike the most absorbent prior art products, even when they give optimum use, and therefore the novel products do not soften, nor do they evolve dust. In addition they are non-staining.

The uniform grain structure of the calcium silicate granulates or powders used according to the invention is another advantage. The required grain size can be adjusted by grading (e.g. by screening). Advantageously, the grain size of the calcium silicate granulates or powders used according to the invention is up to 5 mm. Grain sizes of from 1 to 4 mm are preferred for use for hydrophilic absorption and adsorption, and up to 2.5 mm for use for oleophilic absorption and adsorption.

Another advantage of the use according to the invention is that when the calcium silicate granulates or powders used according to the invention are subjected to optimum liquid saturation they do not release liquid when subjected to pressure. This is particularly important when the liquid to be absorbed or adsorbed is oil.

One advantageous aspect of the use according to the invention consists in use for hydrophilic absorption or adsorption. The term "hydrophilic absorption or adsorption" denotes the absorption or adsorption of water and aqueous media, e.g. urine, including the same being present in vapor form.

The calcium silicate granulates or powders used according to the invention have an alkaline pH of generally 9 to 10, preferably 9.4 to 9.8. They therefore have an acid-fixing action. For example, they can chemically neutralize odor-forming compounds, such as uric acid, in animal urea, and hence have a small eliminating action without additives, this being a great advantage of the use according to the invention and opening up a wide range of uses including areas with quite special conditions.

Another advantage of the use according to the invention is the bactericidal action of the calcium silicate granulates or powders used according to the invention.

In view of these facts, a particularly preferred special aspect of the use according to the invention is use as animal litter. Particularly preferred is use as a cat litter. Compared with the use of the known products in this area, the use according to the invention has the great advantage of superior absorption and adsorption (high absorption capacity and accelerated absorption) of the calcium silicate granulates or powders used according to the invention while in addition, as already stated, they are not only stable as regards shape and consistency but also eliminate smells and are bactericidal.

Another special aspect of the use according to the invention is use for the absorption and adsorption of vapors from gases. One example of this is the absorption and adsorption of kitchen fumes. Not only the water, but also the fat constituents can be absorbed and adsorbed in these conditions. Particularly advantageous in this specific area is the ease of replaceability and the hygienic character of the calcium silicate granulates or powders used according to the invention. Gas drying is another example.

The said alkaline pH range of the calcium silicate granulates and powders used according to the invention opens up another specific aspect of use according to the invention, i.e. the separation of acid constituents, such as hydrogen chloride or carbon dioxide, from gas mixtures.

Another advantageous aspect of the use according to the invention lies in use for oleophilic absorption or adsorption. The term oleophilic absorption or adsorption denotes the absorption or adsorption of oils, such as mineral oils, lubricating oils and vegetable oils, possibly from media which contain the same in addition to other constituents, e.g. oil-in-water dispersions.

With the use according to the invention, selection of the calcium silicate granulate or powder enables oleophilic absorption and adsorption to be obtained in addition to hydrophilic absorption and adsorption up to the limit of the absorption capacity. This may be important in practice, for example the calcium silicate granulate or powder having the oil in absorbed or adsorbed form can be made to sink by water absorption or adsorption.

The character of the calcium silicate granulates or powders used according to this invention can also be changed by additives and the quantity thereof to provide more hydrophilic absorption or adsorption behavior or in the direction of more oleophilic absorption or adsorption behavior, i.e. to the benefit of the adsorption or absorption of one or other liquids which differ in respect of their surface tension.

For example, according to one advantageous aspect of the use according to the invention, the calcium silicate granulate or powder used contains at least one primary and/or secondary fatty amine as an additive. Preferably, the calcium silicate granulate or powder used contains a fatty amine or fatty amines, one or each alkyl radical of which contains a fatty amine or a mixture of fatty amines selected from the group consisting of primary fatty amines, the alkyl group of which contains between 16 and 20, peferably 18, carbon atoms and secondary fatty amines, the alkyl radical of which contains 16 to 20 carbon atoms, more particularly 18 carbon atoms. In this aspect of the invention, the hydrophilic absorption and adsorption are promoted with an oleophobic character.

According to another advantageous aspect of the use according to the invention, the calcium silicate granulate or powder used contains at least one polyamide was having a melting point of from 170° to 195° C., more particularly 180° to 190° C., and a decomposition point of at least 200° C., as additive. Preferably, the calcium silicate granulate or powder used contains polyamide wax or waxes of non-amorphous structure in the micronized (finely ground) state. It is particularly preferable if the calcium silicate granulate or powder used contains polyamide wax or waxes in the form of a diamide wax or waxes of the general formula

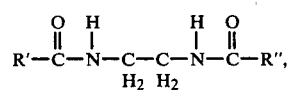

where R' and R" denote alkyl radicals containing 12-20, more particularly 12-18 C-atoms, it being particularly preferably for R' to denote an alkyl radical containing 12 carbon atoms and R" an alkyl radical containing 20, or more advantageously 18, carbon atoms. In this aspect of the invention the absorption and adsorption is shifted oleophilically or towards an oleophilic character respectively.

According to another advantageous aspect of the use according to the invention, the calcium silicate granulate or powder used contains at least one primary and/or secondary fatty amine salt as additive. Preferably, the calcium silicate granulate or powder used is one which contains a fatty amine salt or salts, one or each alkyl radical of which contains 16 to 20, more particularly 18, carbon atoms. Preferably again, the calcium silicate granulate or powder used contains a fatty amine salt or salts with an organic carboxylic acid or acids containing 1 to 11, more particularly 2 to 4, carbon atoms, more particularly acetic acid. Preferably again, the calcium silicate granulate or powder used contains a fatty amine salt or salts, only a proportion of which, more particularly 25 to 30%, is neutralized by the acid. In this aspect too the absorption and adsorption are shifted oleophilically or towards the oleophilic character respectively.

If required, the calcium silicate granulate or powder used may contain at least one polyamide wax together with at least one fatty amine salt.

Advantageously, the calcium silicate granulate or powder used is one into which the fatty amine or amines, or the polyamide wax or waxes, and/or the fatty amine salt or salts, is/are introduced by addition to the initial production mixture before the reaction of the latter. Of course the quantities, e.g. the above-indicated advantageous quantity ranges, of the other starting materials, will be reduced proportionately accordingly. Surprisingly, the said additives have the basic property of not impairing the process for the production of the calcium silicate granulates or powders used according to the invention, and their required product characteristics, because of their chemical resistance to the chemico-physical effects involved in the process. For example, the stages required in the production process, e.g. the temperature treatment at about 200° C., can be carried out unrestrictedly under hydrothermal hardening conditions, without any adverse effects, i.e. without the efficacy of the required product properties suffering in respect of the superior absorption with respect to liquids having different surface tensions, and in respect of the other parameters.

In the case of a fatty amine or amines as additive, it is preferable for the same to be added to the initial production mixture in a quantity of from 0.05% to 0.5% by weight, more particularly 0.05 to 0.3% by weight, more specifically 0.25% by weight, based on the amount of solids mixture used, and calculated as dry weight. These additives are advantageously used in the form of preferably 5 to 15%, more particularly 10%, aqueous dispersions. The amount of dispersion must, of course, be adjusted to the dry quantity of additive required. For example, in the case of a 10% aqueous dispersion, the preferred quantity range thereof is from 0.5 to 5% by weight, more particularly 0.5 to 3% by weight, specifically 2.5% by weight, based on the amount of solids mixture used and calculated as dry weight.

Preferably, the calcium silicate granulate or powder used is one in which the polyamide wax or waxes is/are added to the initial production mixture in a quantity of from 3 to 7% by weight, more particularly 5% by weight, based on the quantity of solids mixture used and calculated as dry weight. The greater the quantity of polyamide wax, the more oleophilic the absorption and adsorption behavior of the resulting calcium silicate granulates or powders used according to the invention. In the case of quantities of polyamide wax below 3% by weight, the absorption and adsorption behavior is no longer completely or decisively oleophilic.

Preferably, the calcium silicate granulate or powder used is one in which the addition of the fatty amine salt or salts to the initial production mixture has been made in a quantity of from 0.05 to 0.5% by weight, more particularly 0.05 to 0.3% by weight, specifically 0.25% by weight, based on the amount of solids mixture used and calculated as dry weight. These additives are advantageously used in the form of preferably 5 to 15%, more particularly 10%, aqueous dispersions. The amount of dispersion must, of course, again be adjusted to the dry quantity of additive required. For example, in the case of a 10% aqueous dispersion, the preferred quantity range thereof is 0.5 to 5% by weight, more particularly 0.5 to 3% by weight, specifically 2.5% by weight, based on the amount of solids mixture used and calculated as dry weight. The greater the amount of fatty amine salt, the more oleophilic the absorption and adsorption behavior of the resulting calcium silicate granulates or powders used according to the invention.

According to another advantageous aspect of the use according to the invention, the calcium silicate granulate or powder used is one which after drying has been treated with one or more saponification-resistant alkyl, alkoxy silanes and/or phenyl alkoxy silanes. This treatment may be carried out before or after grading. It may be carried out by immersing the calcium silicate granulates or powders into, or spraying them with, the alkyl alkoxy silane or silanes and/or phenyl alkoxy silane or silanes, or vapor-deposition of the latter on the former. Preferably, the calcium silicate granulate or powder used contains alkyl alkoxy silane or silanes in which the possibly branched alkyl portion has 1 to 6, more particularly 3 to 6, specifically 3, carbon atoms while the possibly branched alkoxy portion has 1 to 3, more particularly 3, carbon atoms. Preferably, the calcium silicate granulate or powder used contains a phenyl alkoxy silane or silanes whose possibly branched alkoxy portion contains 1 to 3, more particularly 3, carbon atoms. Most preferably, the alkyl radical is an isopropyl radical and the alkoxy radical is an isopropoxy radical. Preferably again, the calcium silicate granulate or powder used has been treated with the saponification-resistant alkyl alkoxy silane or silanes and/or phenyl alkoxy silane or silanes up to absorption of a quantity of at least 0.5% by weight, more particularly 1.2 to 1.6% by weight, specifically 0.9% by weight.

As already stated, the calcium silicate granulates or powders used according to the invention eliminate smells of themselves, but it is possible to use them together with deodorants, such as perfumed oils, which can be applied to them. This is particularly important for specific use as an animal litter.

If required, the calcium silicate granulates or powders used according to the invention may be combined with colored indicators to monitor the degree of saturation of absorption and adsorption.

The invention will be explained in detail by reference to the following examples in conjunction with the accompanying drawings wherein.

EXAMPLE 1

Figure 1:
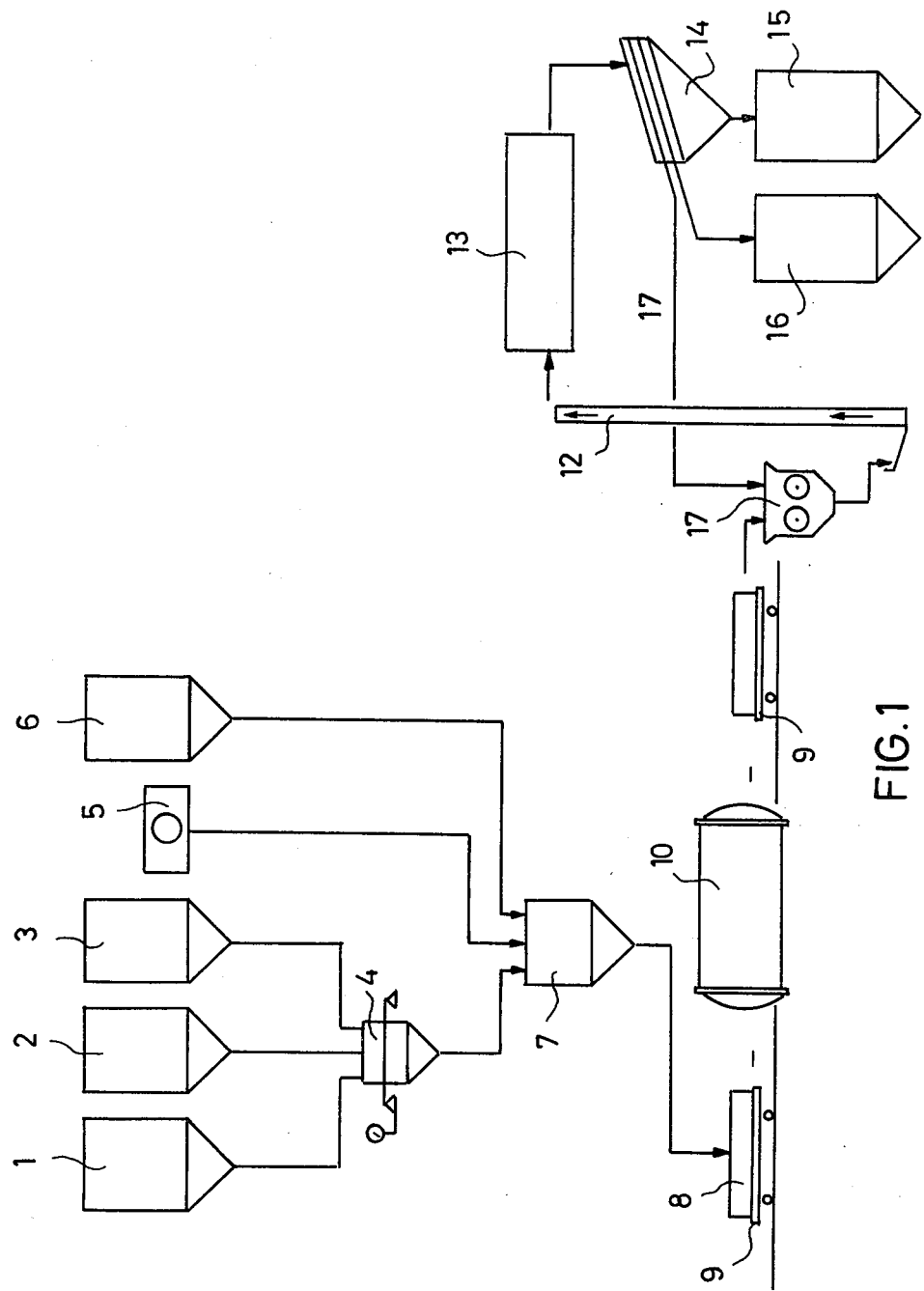
FIG. 1 is a flow diagram showing the production of a calcium silicate granulate or powder used according to one aspect of the invention.

The calcium silicate granulate or powder used was prepared as follows with reference to FIG. 1:

The following solids were used as the starting material:
  50.4% by weight of quartz powder having a grain size of less than 100μ
  33.1% by weight of fine white lime
  16.5% by weight of hydrate of lime
  60% by weight of water with respect to the amount of solids initially used, was also used.

The quartz powder was fed from a quartz powder silo 1, the fine white lime was fed from a fine white lime silo 2 and the hydrate of lime was fed from a hydrate of lime silo 3 via a weighing machine 4 to a mixer 7 as a dispersing means. The mix water was also fed to this mixer 7 from a mix water tank 6.

A microporous stable foam was produced in an active foam generator 5 consisting of a compressor generating compressed air, and an intake nozzle which drew sodium lauryl sulphate with a 50% active substance content in 2% solution in water from a tank (not shown) and injected it into the compressed air by the injector principle. Very small air bubbles thus formed a foam similar to whipped cream.

Mixing was then carried out in mixer 7, the solids being dispersed in the water, mixing being initially carried out for 4 minutes without foam and then the microporous stable foam produced as described above was introduced and worked into the mixture of solids and water for 2 minutes.

The mixture was then fed through a pipe to moulding boxes 8 which were divided up into individual chambers by means of partitions. After a preliminary reaction time of 30 minutes at a temperature of 70° to 80° C., this temperature being produced by the slaking reaction heat of the fine white lime, the partitions were removed from the moulding boxes. The boxes 8 with the resulting mouldings were formed into a train 9 and driven into an autoclave 10 for hydrothermal setting. This took 7 hours (full pressure period) at a pressure of 12 atmospheres gauge.

The train 9 with the boxes 8 containing the hardening calcium silicate blocks were driven out of the autoclave 10 after expansion of the latter.

The boxes containing the hardened calcium silicate blocks were lifted from the train 9 by crane, and were turned through 90°. Since the edge parts of the boxes 8 were conical, they allowed the calcium silicate blocks to fall easily out of the boxes. After emptying, the boxes 8 were returned into the cycle for refilling. The calcium silicate blocks removed from the boxes 8 were introduced by a front loader or via a pre-silo container, into a roll crusher 11 in which they were broken up. The broken calcium silicate was then fed to a dryer 13 by a belt elevator 12. The calcium silicate was dried to a residual moisture of about 3% in the dryer.

The dried calcium silicate containing particles of different particle sizes was fed to a screening machine 14 in which it was graded into a group with particles of up to 2.5 mm, which was collected in a container 15, and a group with particles of 2.5 to 4 mm, which was collected in another container 16. The oversize was returned to the roll crusher 11 via a return line 17. The first group was similarly separated again into a group containing particles less than 0.5 mm (calcium silicate powder) and a group containing particles of from 0.5 to 2.5 mm.

The average material parameters of the calcium silicate granulates or powders obtained were as folows:

| | |
|---|---|
| Compressive strength (measured on compact moulding before comminution) in N/mm$^2$ | |
| In the case of a crude density of 400 kg/m$^3$ | 7.5 |
| In the case of a crude density of 700 kg/m$^3$ | 10.2 |
| Crude density in kg/m$^3$ | 400 to 700 |
| Bulk weight in kg/m$^3$ | 250 to 500 |
| (Bulk density of particle sizes up to 2.5 mm, in kg/m$^3$ | 300 to 500 |
| Bulk density of particle sizes of 2.5 to 4 mm, in kg/m$^3$ | 250 to 450) |
| Absorption capacity in respect of water (water absorption) (for a bulk density of 450 kg/m$^3$): | 200% by weight |
| Absorption capacity in respect of oil (engine oil) (for a bulk density of 450 kg/m$^3$): | 130% by weight |
| pH value: | 9.4 to 9.8 |

Figure 3:
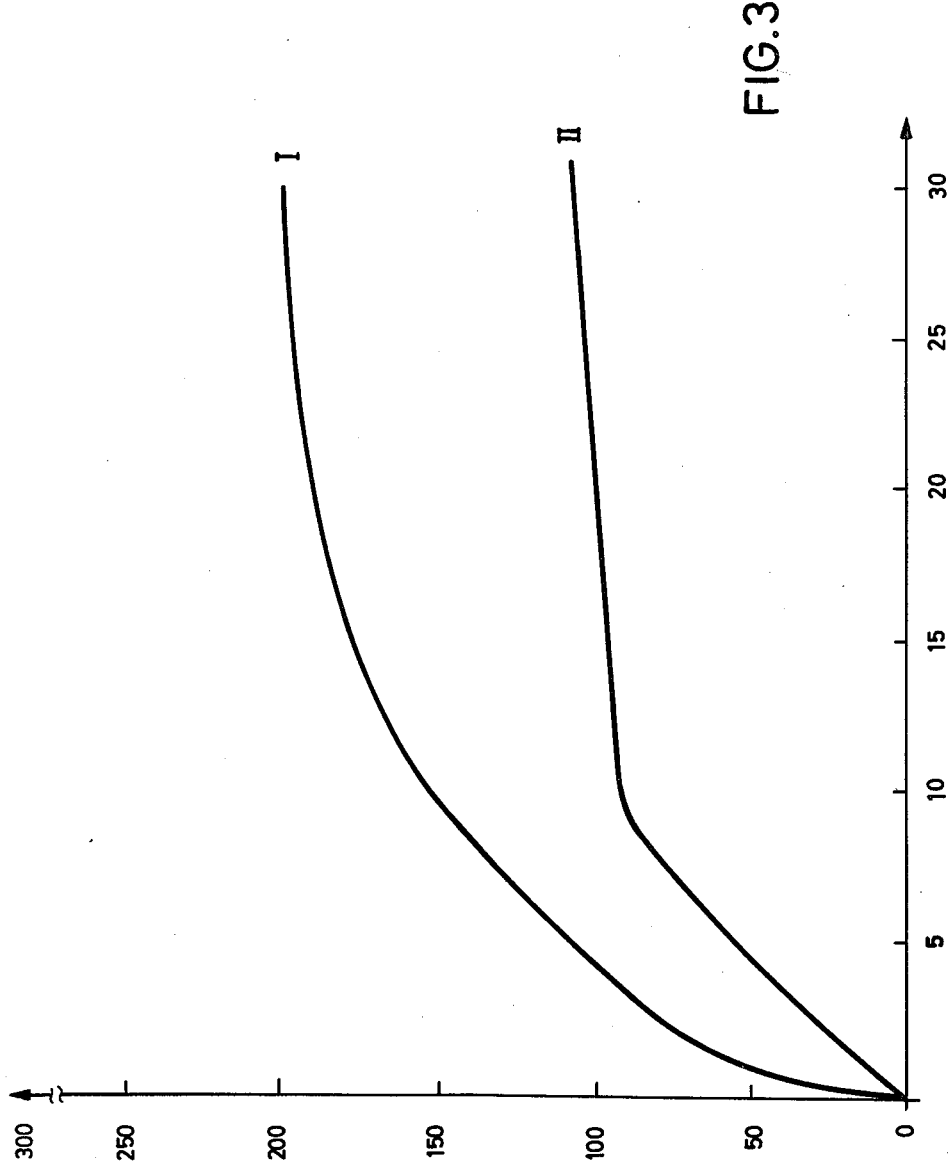

In FIG. 3, the y-axis denotes the water absorption in % by weight while the x-axis denotes the time in minutes. Curve I is the water absorption curve in the case of the calcium silicate granulate or powder prepared as described above and used according to the invention, while curve II is the water absorption curve for a sepiolite-based commercial product, the best cat litter product available commercially hetetofore.

It will be clear from FIG. 3 that the calcium silicate granulate or powder is far superior to the commercial product in respect of absorption and adsorption, the water absorption being 200% by weight as against only 100% by weight. Since the former is also far superior to the latter in respect of smell elimination and the other respects enumerated hereinbefore, the former is very suitable as a superior animal litter.

EXAMPLE 2

The calcium silicate granulate or powder used was prepared as follows with reference to FIG. 1:

Example 1 was repeated except that the following solids were used as the starting materials:
50.4% by weight of quartz powder with a grain size of less than 100μ
42% by weight of quicklime
7.6% by weight hydrate of lime.

The average material parameters of the calcium silicate granulates or powders produced were as follows:

| | |
|---|---|
| Compressive strength (measured on compact moulding before comminution) in N/mm$^2$ | |
| In the case of a crude density of 400 kg/m$^3$ | 7.5 |
| In the case of a crude density of 700 kg/m$^3$ | 10.2 |
| Crude density in kg/m$^3$ | 400 to 700 |
| Bulk density in kg/m$^3$ | 250 to 500 |
| (Bulk density of particle sizes up to 2.5 mm, in kg/m$^3$ | 300 to 500 |
| Bulk density of particle sizes from 2.5 to 4 mm, in kg/m$^3$ | 250 to 450) |
| Absorption capacity in respect of water (water absorption) (for a bulk density of 450 kg/m$^3$): | 205% by weight |
| Absorption capacity in respect of oil (engine oil) (for a bulk density of 450 kg/m$^3$): | 134% by weight |
| pH value: | 9.4 to 9.8 |

The calcium silicate granulate or powder produced in this way was just as advantageous for use as an animal litter as the one produced in Example 1.

EXAMPLE 3

The calcium silicate granulate or powder used was prepared as follows with reference to FIG. 1:

Example 1 was repeated except that the following solids were used as the starting materials:
57% by weight of quartz powder with a grain size of less than 100μ
29% by weight of quicklime
14% by weight of hydrate of lime The average material parameters of the calcium silicate granulates and powders obtained were as follows:

| | |
|---|---|
| Compressive strength (measured on compact moulding before comminution) in N/mm$^2$ | |
| In the case of a crude density of 400 kg/m$^3$ | 6.5 |
| In the case of a crude density of 700 kg/m$^3$ | 8.5 |
| Crude density in kg/m$^3$ | 400 to 700 |
| Bulk density in kg/m$^3$ | 250 to 500 |
| (Bulk density of particle sizes up to 2.5 mm, in kg/m$^3$ | 300 to 500 |
| Bulk density of particle sizes from 2.5 to 4 mm, in kg/m$^3$ | 250 to 450) |
| Absorption capacity in respect of water (water absorption) (for a bulk density of 450 kg/m$^3$): | 208% by weight |
| Absorption capacity in respect of oil (engine oil) (for a bulk density of 450 kg/m$^3$): | 135% by weight |
| pH value: | 9.4 to 9.8 |

The calcium silicate granulate or powder produced in this way was just as suitable as an animal litter as the one in Example 1.

EXAMPLE 4

The calcium silicate granulate or powder used with a polyamide wax content was produced as follows with reference to FIG. 2:

The following starting materials were used in addition to the amount of water used in Example 1:
- 47.9% by weight of quartz powder with a particle size of below 100μ
- 31.4% by weight quicklime
- 15.7% by weight hydrate of lime
- 5.0% by weight of a non-amorphous micronized diamide wax of the formula

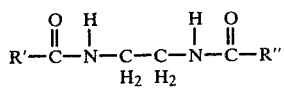

where R' denotes an alkyl radical containing 12 carbon atoms and R'' an alkyl radical containing 18 carbon atoms, having a melting point of 185° C. and a decomposition point of about 205° C. (Lanco-Wax HM 1666, obtained from Messrs. Langer & Co., Ritterhude).

The procedure of Example 1 was followed except that the above diamide wax was added to the mixer 7 from an additive silo 18 via another weighing machine 19. The other parts of the apparatus shown in FIG. 2 are like the corresponding parts of the apparatus having the same reference numerals in FIG. 1.

The absorption and adsorption parameters of the calcium silicate granulate or powder obtained were as follows:

| | |
|---|---|
| Absorption capacity in respect of oil (engine oil) (for a bulk density of 450 kg/m$^3$): | 132% by weight |
| Absorption capacity in respect of water (water absorption) (for a bulk density of 450 kg/m$^3$): | 10% by weight |

The other material parameters were as in Example 1.

With the known inorganic commercial products, the absorption capacity in respect of oil was much lower as will be apparent from the following:
- Sepiolites (crude density 600 kg/m$^3$): 48% by weight
- Pumice stone (crude density 570 kg/m$^3$): 53% by weight
- "Hauser 1" (similar to sepiolite): 68% by weight
- Attapulgite (crude density 500 kg/m$^3$): 72% by weight
- "Hykro": 61.5% by weight It will be apparent from this that the resulting calcium silicate granulate or powder absorbs or adsorbs practically only oil, i.e. its absorption and adsorption behavior was practically completely oleophilic. It was therefore suitable as a superior absorbent and adsorbent for oils, for example when they have leaked.

EXAMPLE 5

Figure 2:
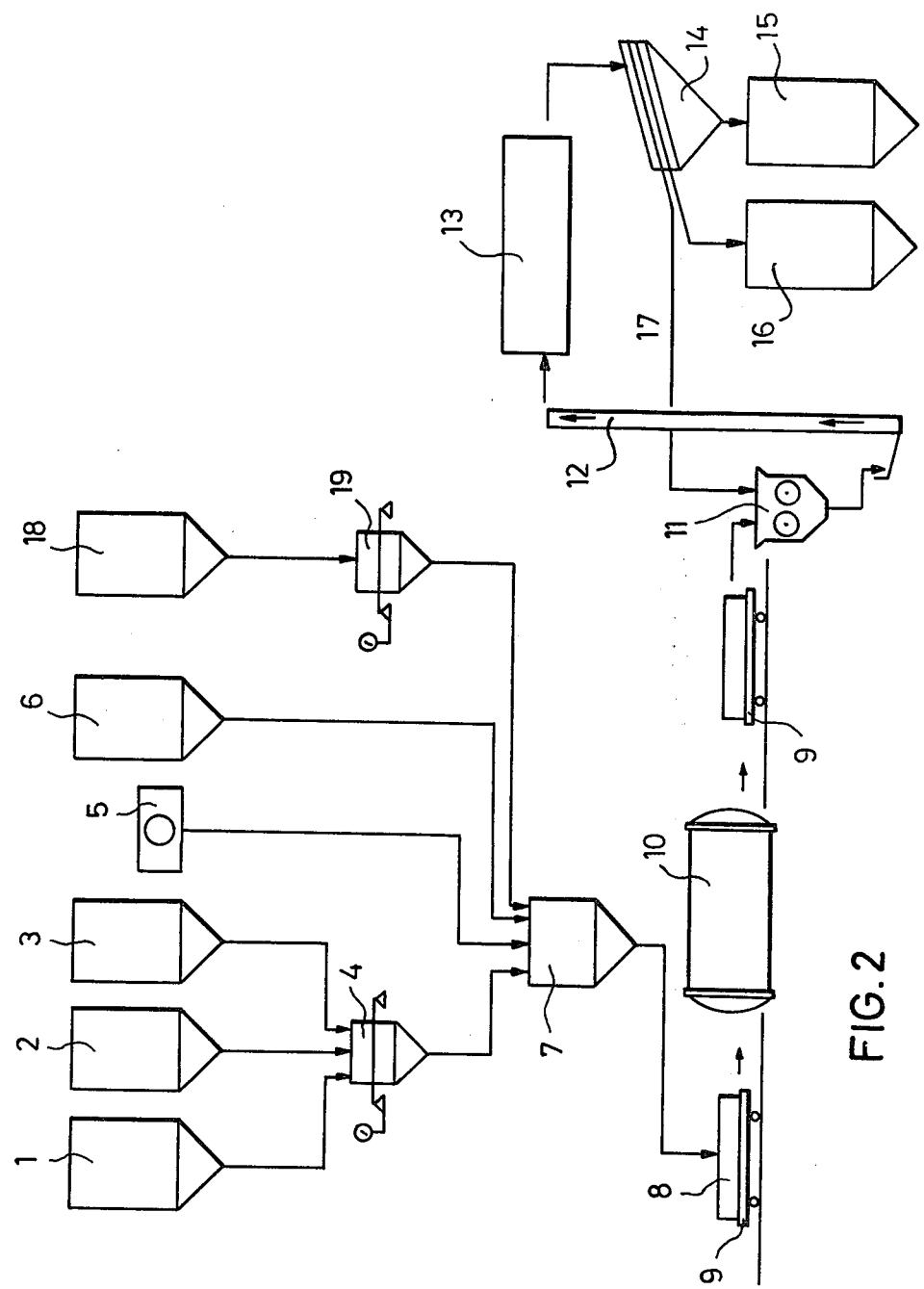
FIG. 2 is a flow diagram showing the production of calcium silicate granulates or powders used according to other aspects of the invention and FIG. 3 is a graph showing the water absorption over time in respect of a calcium silicate granulate used according to the invention and a commercial sepiolite-based product as a reference substance.

The calcium silicate granulate or powder used with a fatty amine salt content was prepared by the method described in Example 4 and with reference to FIG. 2 except that instead of the polyamide wax a fatty amine salt was fed to the mixer 7 from the additive silo 18 via the additional weighing machine 19. The following starting materials were used in addition to the quantity of water used in Example 1:
- 50.3% by weight of quartz powder with a particle size below 100μ
- 41.9% by weight of quicklime
- 7.6% by weight of hydrate of lime
- 0.25% by weight of stearyl amine, neutralized to 28% with acetic acid, in the form of 2.5% by weight of its 10% aqueous dispersion.

The absorption and adsorption parameters of the resulting calcium silicate granulate or powder were as follows:

| | |
|---|---|
| Absorption capacity with respect to oil (engine oil) (for a bulk density of 450 kg/m$^3$): | 140% by weight |
| Absorption capacity with respect to water (water absorption) (for a bulk density of 450 kg/m$^3$): | 3.4% by weight |

The other material parameters were as in Example 2.

It is apparent from this that the resulting calcium silicate granulate or powder absorbed or adsorbed practically only oil, i.e. its absorption and adsorption behavior was practically completely oleophilic. It is therefore suitable as an absorbent or adsorbent for oil (e.g. leakage oil) and is also superior to the known commercial products.

EXAMPLE 6

The calcium silicate granulate or powder prepared in Example 1 was sprayed with isopropyl isopropoxy silane until it had absorbed 0.9% by weight thereof.

The result was a calcium silicate granulate or powder having an absorption capacity of 135% by weight in respect of oil (engine oil). It was purely oleophilic and hydrophobic, the water absorption being less than 1.0% after being kept for 72 hours in water (height of water column about 1 cm). It was therefore suitable as a leakage oil absorbent or adsorbent which was also superior to the known commercial products.

EXAMPLE 7

The calcium silicate granulate or powder used was prepared as follows:

The procedure of Example 4 was repeated except that the following starting materials were used in addition to the quantity of water used in Example 1:
- 54.1% by weight of quartz powder with a particle size below 100μ
- 27.6% by weight of quicklime
- 13.3% by weight of hydrate of lime
- 5.0% by weight of the diamide wax used in Example 4.

The absorption and adsorption parameters of the calcium silicate granulate or powder obtained were as follows:

| | |
|---|---|
| Absorption capacity with respect to oil (engine oil) (for a bulk density of 450 kg/m$^3$): | 136% by weight |
| Absorption capacity with respect to water (water absorption) (for a bulk density of 450 kg/m$^3$): | 8% by weight |

The other material parameters were as in Example 3.

It will be seen from this that the resulting calcium silicate granulate or powder absorbed and adsorbed practically only oil, i.e. its absorption and adsorption behavior was practically completely oleophilic. It was therefore suitable as an absorbent and adsorbent for, e.g., leakage oil, again superior to the known commercial products.

EXAMPLE 8

The calcium silicate granulate or powder used was prepared as follows:

The procedure of Example 5 was repeated except that the following starting materials were used in addition to the quantity of water used in Example 1:

56.9% by weight of quartz powder with a particle size below 100μ
28.9% by weight of quicklime
14% by weight of hydrate of lime
0.25% by weight of stearyl amine, neutralized to 28% with acetic acid, in the form of 2.5% by weight of its 10% aqueous dispersion.

The absorption and adsorption parameters of the resulting calcium silicate granulate or powder were as follows:

| | |
|---|---|
| Absorption capacity with respect to oil (engine oil) (for a bulk density of 450 kg/m$^3$): | 134% by weight |
| Absorption capacity with respect to water (water absorption) (for a bulk density of 450 kg/m$^3$): | 2% by weight |

The other material parameters were as in Example 3.

It will be clear from this that the resulting calcium silicate granulate or powder absorbed and adsorbed practically only oil, i.e. its absorption and adsorption behavior was practically completely oleophilic. It was therefore suitable as an absorbent or adsorbent for oil, e.g. leakage oil, and was again superior to the known commercial products.

We claim:

1. Calcium silicate granules with a fatty amine addition produced by a process comprising the steps of:
    (a) dispersing crystalline and optionally amorphous silicon dioxide or a material containing the same, calcium oxide or a material containing the same, and fatty amine in water, and mixing with a microporous stable foam produced from an anionic surface active substance and water, wherein the molar ratio of calcium oxide to silicon dioxide is 0.8:1 to 1.1:1,
    (b) shaping the foam mixture prepared in step (a),
    (c) autoclave hardening,
    (d) comminuting,
    (e) drying, and
    (f) grading and recovering particle sizes.

2. Calcium silicate granules according to claim 1, wherein 0.05 to 0.5 weight % of said fatty amine, based on the solid mixture quantity used and calculated as dry weight, are added.

3. Calcium silicate granules having a polyamide wax addition, produced by a process comprising the steps of:
    (a) dispersing crystalline and optionally amorphous silicon dioxide, or a material containing the same, and calcium oxide, or a material containing the same, the molar ratio of calcium oxide to silicon dioxide being 0.1:1 to 1.1:1 and a polyamide wax, and mixing with a microporous, stable foam produced in water by means of an anionic, surface-active substance, accompanied by the formation of a foam,
    (b) shaping the foam mixture prepared in step (a),
    (c) autoclave hardening,
    (d) comminuting,
    (e) drying, and
    (f) grading into particles.

4. Calcium silicate granules having a polyamide wax addition, as described in claim 3, wherein 3 to 7% by weight of said polyamide wax are used, based on the solid mixture quantity used and calculated as dry weight.

5. Calcium silicate granules having a fatty amine addition of 0.05 to 0.5% by weight of fatty amine, based on the solid mixture quantity used and calculated as dry weight, produced by the steps comprising:
    (a) dispersing crystalline and optionally amorphous silicon dioxide, or a material containing the same, and calcium oxide, or a material containing the same, the molar ratio of calcium oxide to silicon dioxide being 0.8:1 to 1.1:1, and fatty amine, and mixing with a microporous, stable foam produced in water by means of an anionic, surface-active substance, accompanied by the formation of a foam comprising calcium silicate,
    (b) shaping the foam mixture prepared in step (a),
    (c) autoclave hardening,
    (d) comminuting,
    (e) drying, and
    (f) grading into particles.

6. Calcium silicate granules, according to claim 5, wherein 0.05 to 0.3 weight % of fatty amines are added, based on the solid mixture quantity used and calculated as dry weight.

7. Calcium silicate granules having a fatty amine salt addition, produced by the steps comprising:
    (a) dispersing crystalline and optionally amorphous silicon dioxide, or a material containing the same, and calcium oxide, or a material containing the same, the molar ratio of calcium oxide to silicon dioxide being 0.8:1 to 1.1:1, and fatty amine salt, mixing in a microporous, stable foam produced in water by means of an anionic, surface-active substance, accompanied by the formation of a foam comprising calcium silicate,
    (b) shaping the foam mixture prepared in step (a),
    (c) autoclave hardening,
    (d) comminuting,
    (e) drying, and
    (f) grading into particles.

8. Calcium silicate granules having a saponification-resistant alkoxy silane addition, produced by the steps comprising:
    (a) dispersing crystalline and optionally amorphous silicon dioxide or a material containing the same, and calcium oxide, or a material containing the same, the molar ratio of calcium oxide to silicon dioxide being 0.8:1 to 1.1.:1 and mixing with a microporous, stable foam produced in water by means of an anionic, surface-active substance, accompanied by the formation of a foam,
    (b) shaping the foam mixture prepared in step (a),
    (c) autoclave hardening,
    (d) drying,
    (e) adding saponification-resistant alkoxy silane selected from the group consisting of alkyl alkoxy silanes, whose branched or straight chain alkyl radicals has 1 to 6 carbon atoms and whose branched or straight chain alkoxy radicals have 1 to 3 carbon atoms and phenyl alkoxy silanes, whose alkoxy radical has 1 to 3 carbon atoms or mixtures thereof, (f) classifying.

9. Calcium silicate granules having a saponification-resistance alkoxy silane addition, according to claim 8, wherein the alkoxy silanes are added in a quantity of at least 0.5% by weight, based on the solid mixture quantity used and calculated as dry weight.

* * * * *